United States Patent [19]

Apellaniz

[11] Patent Number: 4,748,035

[45] Date of Patent: May 31, 1988

[54] METHOD FOR HEATING A FOOD CONTAINED IN A CAN

[75] Inventor: Ramon Apellaniz, Lasne, Belgium

[73] Assignee: Tarahelm Limited, London, England

[21] Appl. No.: 945,102

[22] PCT Filed: Mar. 25, 1986

[86] PCT No.: PCT/BE86/00009

§ 371 Date: Jan. 28, 1987

§ 102(e) Date: Jan. 28, 1987

[87] PCT Pub. No.: WO86/05671

PCT Pub. Date: Oct. 9, 1986

[30] Foreign Application Priority Data

Apr. 1, 1985 [LU] Luxembourg ............... 85831

[51] Int. Cl.$^4$ .............. A23L 3/10; F24J 1/00
[52] U.S. Cl. ........................ 426/407; 44/3.3; 126/263; 426/113
[58] Field of Search ............... 426/392, 113, 520, 407; 126/263; 44/3.3

[56] References Cited

U.S. PATENT DOCUMENTS 2,579,405 12/1951 Sukacev ..................... 126/263
4,501,259 2/1985 Apellaniz ..................... 126/263

Primary Examiner—George Yeung
Attorney, Agent, or Firm—Sughrue, Mion, Zinn, Macpeak, and Seas

[57] ABSTRACT

A food contained in a can is heated by a reaction of quicklime with water in an envelope adjacent to that containing the food. According to the invention, in addition to overburnt quicklime, there is used an amount of quicklime having a high or medium reactivity comprised between about 6% and 75% by weight with respect to the total weight of lime. It is also known to use, for the same purpose, quicklime having a low reactivity called "overburnt quicklime", i.e. quicklime having a reactivity with water which has been reduced by calcination at a temperature of more than about 1150° C. The use of such an overburnt lime is necessary. Due to its moderate reaction it allows to obtain a good heat transmission during a long period, to avoid projections of lime milk as well as a loss of heat by emission of water vapor.

5 Claims, No Drawings

METHOD FOR HEATING A FOOD CONTAINED IN A CAN

DESCRIPTION OF THE INVENTION

This invention relates to a method for heating a food contained in a preserve can, such as a tin or a dish, by reaction of quicklime with water contained in an envelope or housing adjacent to that containing the food.

It has been found that overburnt lime is very sensitive to water and that the reactivity of said lime diminishes in course of time, this phenomenon being probably due to the absorption of a small amount of water, despite the measures which are taken for separating the two reagents (quicklime and water) until it is desired to cause them to react with each other.

In fact, even if the water is contained in an impervious plastic container and if a layer of microcrystalline wax is poured onto the surface of the lime layer, a reduction of the reactivity of the overburnt quicklime is observed, so that the duration of the reaction of the quicklime with water becomes too long. Therefore, the maximum temperature which can be reached in the food diminishes when time gradually becomes longer, in proportion to the degradation of the quicklime by the water, so that the time needed for reaching a suitable temperature for the consumption of the food becomes unduly long. This phenomenon is particularly apparent when the food is at a low initial temperature (0° to 10° C.).

It has now been found that it is possible, in a surprisingly simple manner, without using other reagents than water and quicklime, to avoid said drawbacks and to considerably improve the transmission of heat from the reaction mixture to the food, while avoiding projections of lime milk and/or heat losses by emission of water vapor.

According to the present invention, quicklime having a high or medium reactivity is added to overburnt quicklime in a proportion of 6 to 75% by weight of the total weight of used quicklime (quicklime having a high reactivity+quicklime having a low reactivity).

The proportion of quicklime having a high or medium reactivity is preferably of about 12 to 50% by weight with respect to the total weight of lime.

When less than about 6% by weight of quicklime having a high or medium reactivity with respect to the total weight of quicklime are used, no noticeable influence of the addition of this quicklime having a high or medium reactivity is found. When, on the other hand, more than about 75% by weight of quicklime having a high or medium reactivity are used, the reaction is too quick and heat losses such as water vapor emission and/or lime milk projections occur.

According to the present invention, for a standard preserve can containing 420 grams of food, about 17 to 100 grams of quicklime having a high reactivity are preferably used with respect to a total amount of quicklime (overburnt quicklime+quicklime having a high or medium reactivity) of 140 to 200 grams.

The terms "quicklime having a high or medium reactivity", as used herein, refer to a softly burnt quicklime, i.e. a lime burnt at a temperature comprised between 900° and 1150° C. This type of lime which is commonly manufactured and used is a very porous lime reacting quickly when contacted with water.

In the process according to this invention, the two types of quicklime are preferably used as grains of a size of about 2 to 5 mm. The grains of quicklime of one type may be mixed with grains of the other type. It is also possible to use two superimposed layers containing each a single type of quicklime. So, it is possible to use, for example, a layer of grains of quicklime having a high or medium reactivity on top of a layer of grains of overburnt quicklime or vice versa.

When quicklime having a high or medium reactivity is added, it has been surprisingly found that the amount of water reacted with the mixture of overburnt quicklime and of quicklime having a high or medium reactivity can be reduced from 0.75 part by weight to 0.4 part by weight of water for each part of quicklime. This has the advantage of diminishing the weight and volume of the used heating materials (reagents).

When a mixture of overburnt quicklime and of quicklime having a high or medium reactivity is used according to this invention, it appears that, as soon as water is contacted with this mixture, the fraction of quicklime having a high or medium reactivity is hydrated and emits almost immediately an amount of heat which is sufficient for increasing the temperature of the reaction mixture to more than 80° C. At this temperature, the transmission of heat to the food starts and the overburnt quicklime starts progressively to react, even if the reactivity of this overburnt quicklime has been slowly decreased in the course of time by absorption of minor amounts of water. The heat produced by the hydration of quicklime having a high or medium reactivity triggers the hydration reaction of overburnt quicklime.

Moreover, due to the addition of quicklime having a high or medium reactivity to the overburnt quicklime, the initial heating effect of the lime is maintained during more than one year, as shown by long run tests.

The addition of quicklime having a high or medium reactivity reduces the time needed for heat transfer to the food and it allows also to obtain a better heating of the food (a higher final temperature), the danger of projections of lime milk and emission of water vapor being substantially reduced.

Another advantage of the method according to the invention is that the addition of quicklime having a high or medium reactivity allows an easy adjustment of the reactivity of the total mass of quicklime to the optimum value.

Although it is difficult to understand the advantageous effects of the use of quicklime having a high or medium reactivity, it is believed that this type of quicklime protects the overburnt quicklime against any deterioration by water, due to the fact that the latter is preferably absorbed by said quicklime having a high or medium reactivity, this type of quicklime having a greater affinity for water.

TESTS

The following non-limitative tests illustrate the method according to the invention:

FIRST SERIES OF TESTS

These tests show the gradual reactivity loss of overburnt quicklime.

Four cylindrical tins provided with a quick opening system containing each 425 g of thick soup (to be heated) have been coaxially placed in a metal box having a heat insulated outer wall. The annular chamber between the two boxes had a volume of 450 cm$^3$. 170 g of quicklime having the shape of small grains of a size between 2 and 5 mm have been placed in said annular chamber. This quicklime was previously overburnt at a temperature of 1200° C. during 4 hours. This overburning treatment reduces the reactivity of the quicklime so as to allow a gradual release of the hydration heat during 10 minutes.

A layer of 20 g of microcrystalline wax was poured at a temperature of 60° C. onto the layer of overburnt quicklime in said annular chamber. The wax became solid in contact with the lime mass and with the metal walls.

170 g of water contained in a flexible plastic bag have been placed in the annular chamber. This was finally tightly closed by means of a metal ring crimped on the two boxes.

The four boxes have been tested 1, 4 and 8 months after the manufacture thereof.

The initial temperature of the soup was of 17° C. in all tests. The metal ring, the water containing bag and the wax layer have been pierced in two places by means of a needle.

RESULTS

After 1 month

After one minute, the slaking reaction started. The temperature of the food was of 63° C. ten minutes after the piercing operation. A maximum temperature of 65.5° C. was obtained after 12 minutes. This corresponds to a Δ T of 48.5° C.

After 4 months

The reaction started after 2 minutes and the temperature was of 58° C. after 10 minutes. A final temperature of 63.5° C. was obtained after 12 minutes. This corresponds to a Δ T of 46.5° C.

After 8 months

The reaction started after 3.5 minutes and the temperature was of 54° C. after 10 minutes. The maximum temperature was of 60° C. after 12 minutes. This corresponds to a Δ T of 43° C.

These tests show that the reactivity of the overburnt quicklime has clearly diminished, this causing a gradually longer delay for initiating the reaction and a gradually greater decrease of the Δ T.

SECOND SERIES OF TESTS

A second series of tests have been made under the same conditions as in the first series of tests, except that, instead of 170 g of overburnt quicklime, 140 g of the same overburnt quicklime, to which 30 g of a quicklime having a high reactivity have been added, were used; the quicklime having a high reactivity was obtained by calcination of lime at 1050° C. during 4 hours.

The total weight of quicklime was the same as in the first series of tests (170 g). Four soup boxes have been tested after the same periods of time.

After 1 month

The slaking reaction started after 30 sec. The temperature of the food was of 65° C. 10 minutes after the piercing. After 12 minutes, the maximum temperature of 68° C. was obtained. This corresponds to a Δ T of 51° C.

After 4 months

The slaking reaction started after 40 sec. Ten minutes after the piercing operation, the temperature was of 64° C. After 12 minutes, the maximum temperature of 67.5° C. was obtained. This corresponds to a Δ T of 50.5° C.

After 8 months

The slaking reaction started after 1 minute. After 10 minutes, the temperature was of 62.5° C. After 12 minutes, a maximum temperature of 66.5° C. was obtained. This corresponds to a Δ T of 49.5° C.

The following Table I show the results of the first and second series of tests.

TABLE I

| | | |
|---|---|---|
| Amount of overburnt quicklime (g) | 170 | 140 |
| Amount of quicklime having a high reactivity (g) | 0 | 30 |
| After 1 month | | |
| The reaction starts after (seconds) | 60 | 30 |
| The temperature after 10 minutes is of (°C.) | 63 | 65 |
| The temperature after 12 minutes is of (°C.) | 65.5 | 68 |
| ΔT (maximum) °C. | 48.5 | 51 |
| After 4 months | | |
| The reaction starts after (seconds) | 120 | 40 |
| The temperature after 10 minutes is of (°C.) | 58 | 64 |
| The temperature after 12 minutes is of (°C.) | 63.5 | 67.5 |
| ΔT (maximum) °C. | 46.5 | 50.5 |
| After 8 months | | |
| The reaction starts after (seconds) | 210 | 60 |
| The temperature after 10 minutes is of (°C.) | 54 | 62.5 |
| The temperature after 12 minutes is of (°C.) | 60 | 66.5 |
| ΔT (maximum) °C. | 43.0 | 49.5 |

THIRD SERIES OF TESTS

A third series of tests have been made under the same conditions as for the first series of tests, except that, instead of 170 g of water, amounts of water lower than 0.75 part by weight per part of quicklime were used.

The total weight of the quicklime mixture was the same as in the first and second series of tests (170 g).

Three soup boxes have been tested after 1 month with amounts of water of 127 g (0.75 part by weight of water per part by weight of quicklime), 100 g (0.58 part by weight of water per part by weight of quicklime) and 68 g (0.40 part by weight of water per part by weight of quicklime).

127 g of water

The slaking reaction started after 40 sec. Ten minutes after the piercing operation, the temperature of the food was of 61° C. After 12 minutes, the maximum temperature of 62.5° C. was reached. This corresponds to a Δ T of 45.5° C.

100 g of water

The slaking reaction started after 35 sec. After 10 minutes, the temperature was of 58° C. After 12 minutes, the maximum temperature of 60.5° C. was obtained. This corresponds to a Δ T of 43.5° C.

68 g of water

The slaking reaction started after 35 sec. After 10 minutes, the temperature was of 55.5° C. After 12 minutes, the maximum temperature of 58.5° C. was obtained. This corresponds to a Δ T of 41.5° C.

FOURTH SERIES OF TESTS

A fourth series of tests have been made under the same conditions as in the second series of tests, except that, instead of 170 g of water, amounts of water lower than 0.75 parts by weight of water per part of quicklime were used.

The total weight of the mixture of limes was the same as in the three first series of tests (170 g).

Three soup boxes have been tested after 1 month with amounts of water of 127 g (0.75 part by weight of water per part by weight of quicklime), 100 g (0.58 part by weight of water per part by weight of quicklime) and 68 g (0.40 part by weight of water per part by weight of quicklime).

127 g of water

The slaking reaction started after 30 sec. Ten minutes after the piercing operation, the temperature of the food was of 66° C. After 12 minutes, the maximum temperature of 69° C. was obtained. This corresponds to a Δ T of 52° C.

100 g of water.

The slaking reaction started after 25 sec. After 10 minutes, the temperature was of 66.5° C. After 12 minutes, the maximum temperature of 70° C. was obtained. This corresponds to a Δ T of 53° C.

68 g of water

The slaking reaction started after 25 sec. After 10 minutes, the temperature was of 64° C. After 12 minutes, the maximum temperature of 64.5° C. was obtained. This corresponds to a Δ T of 47.5° C.

The results of the third and fourth series of tests are shown in the Table II.

TABLE II

| | | | | | | | | |
|---|---|---|---|---|---|---|---|---|
| Amount of overburnt quicklime (g) | 170 | | | | 140 | | | |
| Amount of quicklime having a high reactivity (g) | 0 | | | | 30 | | | |
| Amount of water (g) | 170 | 127 | 100 | 68 | 170 | 127 | 100 | 68 |
| Amounts of water (g) per g of quicklime | 1 | 0.75 | 0.58 | 0.4 | 1 | 0.75 | 0.58 | 0.4 |
| The reaction starts after (seconds) | 60 | 40 | 35 | 35 | 30 | 30 | 25 | 25 |
| The temperature after 10 minutes is of (°C.) | 63 | 61 | 58 | 55.5 | 65 | 66 | 66.5 | 64 |
| The temperature after 12 minutes is of (°C.) | 65.5 | 62.5 | 60.5 | 58.0 | 68 | 69 | 70 | 64.5 |
| ΔT (maximum) °C. | 48.5 | 45.5 | 43.5 | 41.5 | 51 | 52 | 53 | 47.5 |

Additional tests have shown that the favourable effects of the presence of both quicklime having a high or medium reactivity and overburnt quicklime occur if the amount of quicklime having a high or medium reactivity (soft burnt lime) is not greater than about 75% by weight of the total weight of used quicklime, and that it is possible to reduce the amount of water to 0.40 part by weight of water per part by weight of quicklime; this allows the use of an amount of water which is slightly higher than the stoichiometric amount of water necessary for the reaction.

These tests have also shown that the temperature of the heated food remains sufficiently high during the consumption of the latter, particularly when the outer envelope of the can is protected by a heat insulating layer, against heat losses.

In the present specification, the term "food" designates various foods, as well as drinks which are consumed in hot state. These foods may be in the form of liquids, pastes or solids. The foods may be soup, drinks, cooked vegetables or cooked pastes possibly mixed with pieces of meat, etc.

It is obvious that the invention is not limited by the details described hereabove and that many modifications of these details may be made without escaping of the scope of the invention.

I claim:

1. In a process for heating a food contained in a can adjacent to an envelope containing quicklime and water separated by a wall which can be easily pierced or ruptured, said process comprising the step of piercing or rupturing said wall so as to enable a contact between the water and the quicklime, the improvement comprising reacting, after piercing or rupturing said wall, the water with two types of quicklime comprising (1) quicklime having a high or medium reactivity and (2) overburned quicklime to produce heat for heating the food contained in the can, the proportion of quicklime having a high or medium reactivity being comprised between about 6 and 75% by weight of the total weight of the two types of quicklime.

2. In a process for heating a food contained in a can adjacent to an envelope containing quicklime and water separated by a wall which can be easily pierced or ruptured, said process comprising the step of piercing or rupturing said wall so as to enable a contact between the water and the quicklime, the improvement comprising reacting, after piercing or rupturing said wall, the water with two types of quicklime comprising (1) quicklime having a high or medium reactivity and (2) overburned quicklime to produce heat for heating the food contained in the can, the proportion of quicklime having a high or medium reactivity being comprised between about 6 and 75% by weight of the total weight of the two types of quicklime and the amount of water being of about 0.4 to 3 parts by weight for 1 part by weight of the two types of quicklime.

3. A process according to claim 1, in which about 12 to 50% by weight of quicklime having a high or medium reactivity are used with respect of the total weight of the two types of quicklime.

4. A process according to claim 2, in which about 12 to 50% by weight of quicklime having a high or medium reactivity are used with respect of the total weight of the two types of quicklime.

5. A process according to claim 1, in which about 17 to 100 grams of quicklime having a high or medium reactivity per about 140 to 200 grams of the total of the two types of quicklime are used for a food can of 420 grams.

* * * * *